E. A. BOHLMAN.
METALLIC POWER BELT.
APPLICATION FILED SEPT. 16, 1912.
1,106,355.
Patented Aug. 4, 1914.
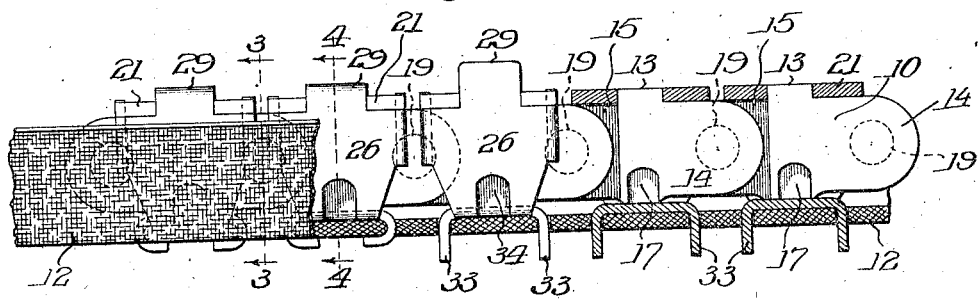
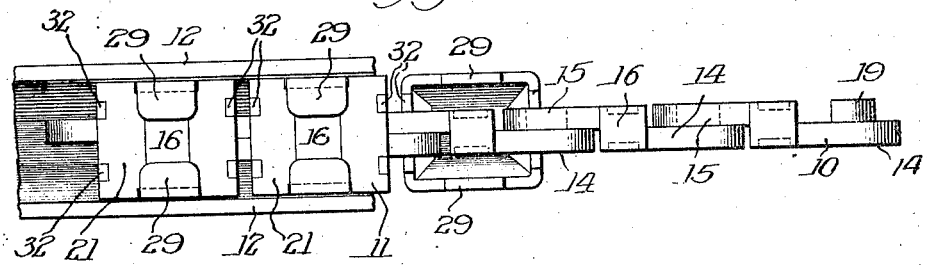
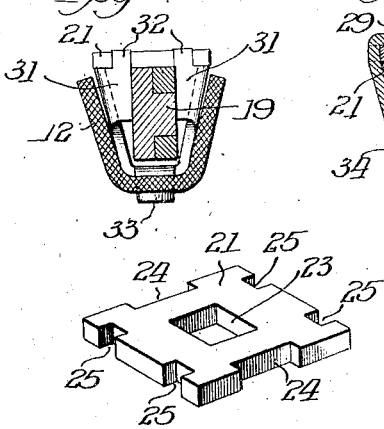
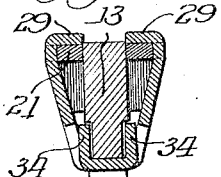
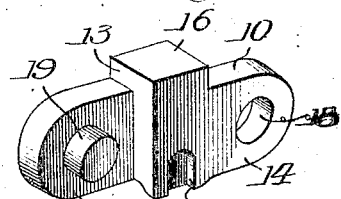
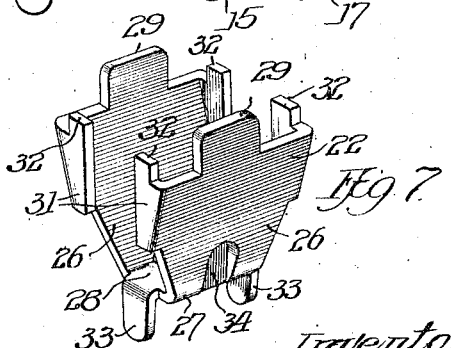
Witnesses:
Geo. C. Dawson
J. C. Carpenter
Inventor:
Ernest A. Bohlman
By Luthann, Beth Fuller
Attys.

UNITED STATES PATENT OFFICE.

ERNEST A. BOHLMAN, OF CEDAR RAPIDS, IOWA, ASSIGNOR TO JAMES E. CAGNEY, JR., OF CHICAGO, ILLINOIS.

METALLIC POWER-BELT.

1,106,355.   Specification of Letters Patent.   Patented Aug. 4, 1914.

Application filed September 16, 1912. Serial No. 720,501.

*To all whom it may concern:*

Be it known that I, ERNEST A. BOHLMAN, a citizen of the United States, residing at Cedar Rapids, in the county of Linn and State of Iowa, have invented certain new and useful Improvements in Metallic Power-Belts, of which the following is a specification.

My invention relates in general to power belts for transmitting power from one machine element to another, and more particularly to that class of belts known as metallic or chain belts which are constructed for use in light machinery such as the fans of automobiles and the like, and aims to provide a belt which will be strong, durable and efficient, and at the same time sufficiently flexible to permit it to be used on pulleys of small diameter closely mounted together, the belt being adapted to run at high speeds without danger of heating or sticking in the pulleys.

A further aim of my invention is to provide a power belt which will be so shaped as to accurately fit the grooves of grooved pulleys, the portions of the belt coming successively in contact therewith being exact duplicates of each other, and all being accurately shaped and dimensioned.

Another aim of the invention is to provide a power belt consisting of a minimum number of parts of simple construction capable of being readily assembled and connected together with a minimum amount of labor, thereby reducing the initial cost of manufacture and facilitating repairs to belts of this general character.

Further objects and advantages of my invention will be apparent as the same is better understood from the following description which, taken in connection with the accompanying drawings, illustrates a preferred embodiment thereof.

On the drawings:—Figure 1 is a side elevation of a power belt made in pursuance of my invention shown partially in section with parts broken away to show the interior construction thereof; Fig. 2 is a top plan view of the same with parts broken away and removed; Fig. 3 is a transverse sectional view on the line 3—3 of Fig. 1; Fig. 4 is a similar view on the line 4—4 of Fig. 1 with the friction sheet removed; Fig. 5 is a perspective view of one of the links; Fig. 6 is a similar view of the top spacing member, and Fig. 7 is a similar view of the embracing or V-shaped element.

The power belt embodying my invention illustrated on the drawing is composed primarily of a plurality of links 10, housings 11 and a friction strip 12. Each of the links 10 comprises a central portion 13 and integral offset ends 14 and 15. The central portion in the present embodiment of the invention is substantially square in cross-section, and extends above the top surfaces of the ends to form the projection 16, and is provided at its bottom on each side with a recess 17, the recesses 17 and the projection 16 being adapted to be engaged by the housing 11, as will be later described. Each of the ends 14 and 15 has a width preferably equal substantially to one-half the width of the central portion, and is offset so that its inner face is disposed along the longitudinal axis of the central portion 13. In the end 15 is formed a cylindrical aperture 18, and on the end 14 and preferably integral therewith is provided a stud 19 of appropriate size to fit in the aperture 18 of the link next adjacent. When the links are assembled, as shown in the right half of Fig. 2, with the studs 19 disposed in appropriate apertures 18, it will be observed that the combined widths of the ends of the adjacent links thus pivotally engaged will equal substantially the width of the central portion 13 of each link, providing thereby a chain formed of a plurality of links, the sides of which fall in substantially the same planes.

The belt is given its V-shaped form by housings 11 which preferably embrace each link, and which also serve to retain the studs 19 within their appropriate apertures 18. These housings are preferably constructed of two parts, i. e., a top spacing member 21 and an embracing element 22. Through the center of the spacing member 21 is provided an aperture 23 adapted to snugly fit over the projection 16 of the central portion of the link. At each side of the spacing member is a recess 24, and at each end a pair of recesses 25, in which the embracing element is secured. This element is preferably constructed of a single sheet of suitable metallic material bent to provide the inclined side walls 26 tapering toward their base 27 and joined together at their base by the bottom portion 28. Upon the upper edge of each side wall is provided an upstanding ear 29 of a width substantially equal to the length of the recess 24 in the spacing member 21, and of a depth substantially greater than the thickness of the said spacing member. The ends of each side wall are bent inwardly to provide a pair of wings 31 disposed in substantially parallel relation, the pairs of wings being spaced apart a distance substantially equal to the combined thickness of the pivotally connected ends of the links. Each of these wings is provided with an upwardly extending lug 32 adapted to snugly fit within its corresponding recess 25 in the spacing member 21 when the parts are assembled. The bottom portion 28 of the sheet forming the embracing element is extended longitudinally beyond the base of the side walls 26, and bent downwardly to form the projections 33, the function of which will be hereinafter described. The side walls are stamped inwardly adjacent their lower edges into substantially vertical position to provide the ears 34 positioned to fit within the recesses 17 at the base of the central portion 13 of the link.

When the parts are assembled the links 10 are interengaged, as shown in Fig. 2, the embracing member 22 is slipped into position from beneath the link so that the ears 34 are disposed in the recesses 17, and the spacing member is positioned above the link and moved downwardly until the projection 16 of the link is disposed through the recess 23 and the ears 29 and the lugs 32 are positioned respectively in the recesses 24 and 25 of the spacing member. The parts may be permanently secured in this position by bending down the ears 29 over the top of the spacing member as is possibly best shown in Fig. 2. It will be noted that when the parts are thus assembled the wings 31 loosely embrace and retain in coöperative relation the ends of two adjacent links. The external length of the side walls 26 should be slightly less than the distance between the pivotal axes of the links so that each stud 19 is retained in its aperture 18 by two pairs of wings 31, one pair being located upon each housing adjacent the pivotal connection between the links. It will be apparent also that by virtue of the connections described between each link and its corresponding spacing and embracing members all play and wear of these parts are eliminated as the ears 34 and the lugs 32 of the embracing member and the projection 16 of the link 10 prevent relative movement of the parts longitudinally of the belt by engaging respectively the recesses 17 of the link and the recesses 25 and 23 of the spacing member. The ears 29 which engage in the recesses 24 and are bent down over the top surface of the spacing member 21 also serve to prevent relative lateral and longitudinal movement between the parts. It will be apparent, however, that one or more of these connections may be omitted without detracting materially from the efficiency of the construction or departing from the spirit or scope of the invention.

In the present embodiment of the invention I provide a continuous friction sheet 12 which is disposed beneath the housing and embraces the outer face of each side wall 26. The sheet is retained in position by means of the projections 33 which are disposed through the sheet and bent toward each other as best seen in Fig. 1, although it will be apparent that each housing may be provided with an individual friction member, and that this friction member may be of any desired form and construction without departing from the spirit or scope of the invention.

It is thought that the invention and many of its attendant advantages will be understood from the foregoing without further description, and it will be obvious that various changes may be made in the form, construction and arrangement of the parts without departing from the spirit and scope of the invention, or sacrificing any of its advantages, the form hereinbefore disclosed being merely one preferred embodiment thereof.

I claim:—

1. A power belt comprising a plurality of pivotally connected links, a substantially V-shaped member carried by each link, the ends of the side walls of said member being bent to engage the sides of the links at the pivotal connections whereby the links are held against disengagement and the side walls intermediate the ends being spaced from the sides of the link.

2. A power belt comprising a series of links pivotally connected together, each link having offset ends so that the outer faces of the links are disposed in common planes, and a metallic housing secured to each link, said housings having side walls diverging from bottom to top to present inclined side faces, the ends of said side walls being bent inwardly to engage the overlapping ends of connected links and prevent the same from becoming disconnected.

3. A power belt comprising a plurality of links pivotally connected together, the ends of each link being laterally offset in opposite directions, and a metallic housing secured to a link, said housing having side walls diverging from bottom to top to present inclined side faces and the ends of said side walls being bent inwardly to engage the outer faces of connected links and prevent said links from becoming disconnected.

4. A power belt comprising a series of links having oppositely offset ends pivotally connected together, and a metallic housing having diverging side walls secured to the top and bottom of a link, the ends of said side walls being bent inwardly to engage the outer faces of interengaged links and retain said links against disengagement.

5. A power belt comprising a series of links having oppositely offset ends provided respectively with a stud and an aperture, the stud of each link being engaged in the aperture of the next link whereby the links are pivotally connected together with their outer faces in alinement, and a housing having diverging side walls carried by a link, said housing having its ends positioned to embrace the outer faces of a plurality of connected links to retain the same in interengagement.

6. A power belt comprising a series of pivotally connected links, each link having its ends offset laterally in opposite directions with respect to the longitudinal axis of the link, the opposite ends being provided respectively with a stud and an aperture, the stud of each link being engaged in the aperture of a succeeding link, and a metallic housing fixedly secured to each link, said housings having diverging side walls to present inclined lateral faces and the ends of said housings being formed to engage the outer faces of three connected links whereby to prevent disengagement of the studs with their respective apertures.

7. A power belt comprising a plurality of pivotally connected links, one of said links having a raised central portion, a spacing member having an aperture adapted to receive the raised portion of the link, and an embracing element secured to the bottom of the link and to the said spacing member.

8. A power belt comprising a plurality of pivotally connected links, one of said links being provided adjacent its bottom with centrally disposed recesses in its side, a spacing member secured to the top of the link, and an embracing element secured to the said spacing member at its ends and having inwardly extending fingers disposed in the recesses at the bottom of the link to prevent relative movement therebetween.

9. A power belt comprising a plurality of pivotally connected links, one of said links having a raised centrally disposed portion, a spacing member having a centrally disposed aperture therethrough through which is disposed the raised portion of the link and having recesses in its sides and ends, and an element provided with a plurality of lugs at its ends and adapted to embrace a link and to have its lugs engaged in the recesses in the spacing member to prevent relative movement between the spacing member, link and the embracing element.

10. A power belt comprising a plurality of pivotally connected links, a spacing member secured to the top of one of said links and provided with recesses in its sides and ends, and an element embracing the said link and having a centrally disposed ear at its upper edges adapted to engage the recesses in the sides of the spacing member and having its ends turned inwardly toward the link and provided with lugs adapted to engage the recesses at the end of the spacing member to prevent relative movement between the spacing member, link and the embracing member.

11. A power belt comprising a plurality of pivotally connected links, a spacing member secured to the top of one of said links, and an embracing member disposed about the said link and secured at its ends to the said spacing member, said embracing member being formed of a sheet of suitable metallic material bent to provide inclined sides connected at the bottom and having inwardly extending projections adjacent the top of each wall provided with lugs on their ends adapted to engage the said spacing member.

12. A power belt comprising a series of links, each provided at one end with an integral pin and at its other end with an aperture, the pins of each link being engaged in the aperture of an adjoining link, and a housing carried by each link having diverging side walls conforming to the inclined grooves of a pulley, the ends of said housings being shaped to embrace the overlapping ends of interengaged links to prevent the pins from becoming disengaged from their respective apertures

ERNEST A. BOHLMAN.

Witnesses:
J. E. CAGNEY, Jr.,
H. F. LEDYARD.